US009335100B2

(12) United States Patent
Vimalchand et al.

(10) Patent No.: US 9,335,100 B2
(45) Date of Patent: May 10, 2016

(54) ASH AND SOLIDS COOLING IN HIGH TEMPERATURE AND HIGH PRESSURE ENVIRONMENT

(75) Inventors: Pannalal Vimalchand, Birmingham, AL (US); Guohai Liu, Birmingham, AL (US); Wanwang Peng, Birmingham, AL (US)

(73) Assignee: SOUTHERN COMPANY, Birmingham, AL (US)

( * ) Notice: Subject to any disclaimer, the term of this patent is extended or adjusted under 35 U.S.C. 154(b) by 903 days.

(21) Appl. No.: 13/198,745

(22) Filed: Aug. 5, 2011

(65) Prior Publication Data

US 2012/0031584 A1 Feb. 9, 2012

Related U.S. Application Data

(60) Provisional application No. 61/372,008, filed on Aug. 9, 2010.

(51) Int. Cl.
*F22B 1/18* (2006.01)
*F28D 21/00* (2006.01)
(Continued)

(52) U.S. Cl.
CPC .............. *F28D 21/001* (2013.01); *C10J 3/523* (2013.01); *C10J 3/76* (2013.01); *C10K 1/022* (2013.01);
(Continued)

(58) Field of Classification Search
CPC ..................................................... F23C 10/24
USPC .......... 55/517, 315.1, 319; 422/145; 122/7 R; 165/67, 95, 119; 48/77; 432/77, 78
See application file for complete search history.

(56) References Cited

U.S. PATENT DOCUMENTS

| 4,106,210 A | * | 8/1978 | Jukkola | ...................... B01J 8/26 34/360 |
| 4,372,937 A | * | 2/1983 | Johnson | ........................ 423/454 |

(Continued)

FOREIGN PATENT DOCUMENTS

| CN | 2578681 Y | 10/2003 |
| CN | 101251251 A | 8/2008 |

(Continued)

OTHER PUBLICATIONS

Examination Report No. 1 in related Australian Patent Application No. 2011289650 dated May 2, 2014.
(Continued)

*Primary Examiner* — Alissa Tompkins
*Assistant Examiner* — John Bargero
(74) *Attorney, Agent, or Firm* — Troutman Sanders LLP; Ryan A. Schneider; Benjamin C. Wiles

(57) ABSTRACT

Disclosed are cooling and depressurization system equipment, arrangement and methods to cool solid particles from a coal gasifier operating at high temperature and pressure. Ash needs to be continuously withdrawn from a circulating fluidized bed gasifier to maintain the solids inventory in the gasifier. The supports for the cooling surfaces are located on the lower temperature upper section of the primary cooler. The cooled solids along with the fluidizing gas exits the primary cooler to a secondary receiving vessel where the solids can be further cooled by conventional means. The fluidizing and entrained gas entering the secondary vessel is filtered and vented through a vent pressure control valve. The column of cooled solids in the secondary vessel is depressurized by a continuous depressurization system to low pressures which are sufficient for conveying the solids to silos for disposal.

22 Claims, 3 Drawing Sheets

(51) Int. Cl.
*F23C 10/24* (2006.01)
*F23J 1/02* (2006.01)
*C10J 3/52* (2006.01)
*C10J 3/76* (2006.01)
*C10K 1/02* (2006.01)
*F28D 7/12* (2006.01)
*F28D 13/00* (2006.01)

(52) U.S. Cl.
CPC ............... *C10K 1/024* (2013.01); *F23C 10/24* (2013.01); *F23J 1/02* (2013.01); *F28D 7/12* (2013.01); *F28D 13/00* (2013.01); *C10J 2300/093* (2013.01); *C10J 2300/1625* (2013.01); *C10J 2300/1861* (2013.01); *C10J 2300/1892* (2013.01); *F23C 2900/10006* (2013.01); *F23J 2900/01002* (2013.01); *F28D 2021/0045* (2013.01)

(56) References Cited

U.S. PATENT DOCUMENTS

| | | | |
|---|---|---|---|
| 4,424,192 A | | 1/1984 | Lomas et al. |
| 4,425,301 A | | 1/1984 | Vickers et al. |
| 4,466,808 A | | 8/1984 | Koog |
| 4,509,589 A | * | 4/1985 | Carlson et al. ............ 165/95 |
| 4,511,434 A | * | 4/1985 | Vasalos ............ 202/99 |
| 4,822,761 A | | 4/1989 | Walters et al. |
| 5,184,671 A | | 2/1993 | Alliston et al. |
| 5,209,287 A | | 5/1993 | Johnson et al. |
| 5,463,968 A | | 11/1995 | Abdulally |
| 5,510,085 A | | 4/1996 | Abdulally |
| 6,869,051 B2 | * | 3/2005 | Bishop ............ 248/71 |
| 6,994,497 B1 | * | 2/2006 | Eriksson et al. ............ 406/124 |
| 7,194,983 B2 | | 3/2007 | Kokko |
| 7,464,669 B2 | | 12/2008 | Maryamchik et al. |
| 2009/0300986 A1 | | 12/2009 | Liu |
| 2010/0028224 A1 | * | 2/2010 | Miller ............ 422/212 |
| 2010/0162625 A1 | * | 7/2010 | Mills ............ 48/76 |
| 2010/0266460 A1 | | 10/2010 | Liu et al. |

FOREIGN PATENT DOCUMENTS

| | | |
|---|---|---|
| JP | 06026613 | 2/1994 |
| TW | 144971 | 11/1990 |

OTHER PUBLICATIONS

International Search Report and Written Opinion dated Apr. 26, 2012 for related Application No. PCT/US2011/046765.

* cited by examiner

ASH AND SOLIDS COOLING IN HIGH TEMPERATURE AND HIGH PRESSURE ENVIRONMENT

CROSS-REFERENCE TO RELATED APPLICATIONS

This application claims the benefit of U.S. Provisional Application No. 61/372,008 filed 9 Aug. 2010, the entire contents and substance of which are hereby incorporated by reference.

BACKGROUND OF THE INVENTION

1. Field of the Invention

The invention relates generally to the cooling of solid particles from applications that are operating at relatively high temperatures and pressures. It is particularly related to cooling high temperature ash from a coal gasifier operating in a temperature range of from approximately 1500° F. to 2200° F., and a pressure range of from approximately 30 to 1000 psia.

2. Description of Related Art

The cooling of hot solids from a gasifier or reactor that is operating in the temperature range of from approximately 1500° F. to 2200° F., and a pressure range of from approximately 30 to 1000 psia presents numerous challenges, none of which have all be overcome by conventional systems.

A first challenge is supporting the heat exchanger tubes that will exchange the heat from the solids to a cooling media. The difficulty in this issue is that the support has to be anchored to the outside wall, penetrating through layers of refractories that are necessary to resist the erosion due to movement of solid particles (in the mass mean diameter size range of from approximately 50 microns to 400 microns), and to insulate the wall from overheating.

Aeration gas to facilitate the movement of hot particles and flow of particles past the cooling surface induces vibration in the cooling tubes and support. The vibration of the support can damage the refractory, and cause the vessel wall to locally overheat. Heat conduction through the support can also overheat the vessel walls, damaging and deforming the vessel. This is a serious concern as the vessel forms the pressure boundary.

A second challenge in the development of a high pressure, high temperature heat exchanger is to achieve appropriate control of the solids flow to the heat exchanger without interfering with the operation of the gasifier or reactor from which the solids are being withdrawn and/or to which the cooled solids are being returned. Also, for the circulating fluidized bed gasifier, when the solids are withdrawn from the standpipe, the aeration gas cannot be returned to the standpipe or the gasifier due to pressure restrictions. Return of aeration gas through the take-off point impedes solids flow to the cooler. Handling of the vent gas is difficult as the gas entrains fines at high process temperatures. Under these circumstances, a challenge becomes how to vent the aeration gas and a portion of the gas entrained by the solids.

A third challenge is optimizing the design of the cooler so that the solids in the cooler, when they come in contact with the heat transfer surfaces, have a temperature range of from approximately 800° F. to 1000° F. Such a consideration improves reliability and durability of the cooler heat transfer surfaces, and facilitates the use of low cost steel for the cooling surface. Although the solids at the inlet of the cooler have a temperature range of from approximately 1500° F. to 2200° F. as they are withdrawn from the gasifier, a robust cooler design necessitates that the solids contacting the heat transfer area have a temperature less than approximately 1000° F. Known exchanger designs have one or two tubesheets supporting the heat exchanger tubes. The tubesheet diameter tends to be large in commercial coolers. It is prudent to design the cooler without exposing the tubesheet to hot solids.

A fourth challenge in cooler equipment design involves appropriate handling of foreign and extraneous materials that originate from or pass through the gasifier. Foreign and extraneous materials in the process result from, for example, contaminated feed, chipped refractory, broken gasifier internals and clinkers and slag formed during the process due to variability in feed fuel (coal, for example) or improper operation. These materials are generally oversized and need to be removed from the process before reaching the heat exchanger surfaces to limit or prevent blockages in the flow path of hot solids.

Conventional systems that cool hot solids from a reactor mainly fall into two application areas: cooling hot solids (catalyst particles) from the fluid catalytic cracking (FCC) process, and from the circulating fluidized bed (CFB combustors) boilers.

In the FCC area, examples include U.S. Pat. No. 4,424,192 to Lomas et al., U.S. Pat. No. 4,425,301 to Vickers et al., U.S. Pat. No. 4,822,761 to Walters et al., and U.S. Pat. No. 5,209,287 to Johnson et al. These teachings are applicable to relatively low pressure processes, as FCC processes normally operate below approximately 50 psi. Among these examples, Johnson et al. discloses using a screen to prevent extraneous materials from entering and interfering with the cooler operation. As one of skill in the art appreciates, however, with gasifier operation, it is highly desirable to discharge extraneous materials from the gasifier, as accumulation of extraneous materials in the gasifier can cause various operating issues including formation of clinkers in the gasifier.

The FCC designs include the hot solids entering the cooler from the top, and the cooled solids exiting from the bottom or side of the vessel near the bottom. Thus, these references disclose systems that require the gas velocity be sufficiently high to fully fluidize the bed particles in order to guarantee that the bed reaches uniform temperature. This is not an issue in the FCC process because the catalyst particle size is relatively uniform, and it is relatively easy to achieve uniform fluidization within a narrow range of the gas velocity.

As one of skill in the art appreciates, the situation is quite different in gasification and combustion processes where the particle size can be in the range of approximately 30 microns to 10,000 microns, and the complete fluidization velocity in the cooler has to be near the minimum fluidization velocity of the largest particle size in the cooler. For 10,000 micron particles, the minimum fluidization velocity can be as high as approximately 10 ft/s, and operating at such high velocities requires large amounts of gas flow through the cooler. It is difficult to return such a large amount of gas flow through the cooler to the gasifier or combustor without interfering with its normal operation.

Another issue with the FCC references is that if the extraneous materials, which are common in gasification and combustion processes, pass through the cooling bundle, they can segregate and accumulate in the bottom of the cooler, eventually interfering with the normal operation of the cooler, since the FCC design has the solids downward flow and side withdrawal near the bottom. It is difficult to apply these teachings to cool the gasifier solids with a broad particle size distribution such as from a fluidized bed or a circulating fluidized bed gasifier.

In the CFB area, examples include U.S. Pat. Nos. 5,510,085 and 5,463,968 to Abdulally, U.S. Pat. No. 5,184,671 to Allison et al., and U.S. Pat. No. 7,194,983 to Kokko. In these teachings, both the solids and the fluidization gas return to the combustor to maintain combustion temperature. As these references disclose in-process coolers, the outside surface of the cooling tubes are essentially in contact with the solids, which solids have temperatures near the operating combustor temperature of approximately 1600° F. Although such operating temperatures make it necessary to use expensive alloy materials for the heat exchanger, the overall environment is tolerable for most alloy engineering materials. As one of skill in the art appreciates, however, with gasifier operation, the operating temperature can reach as high as approximately 2000° F.; thus, the materials selection can be a challenge or the materials cost will be prohibitive when the hot solids at such high temperatures directly contact the heat transfer surface.

Further, except for Kokko, the other CFB examples cited disregard the detrimental effects of extraneous materials entering the heat exchanger. Kokko recognizes the importance of avoiding solids by-passing some of the heat transfer surface, and devises a way to ensure that solids will flow through the entire heat transfer surface. However, in Kokko's design, solids have to make turns in three chambers that naturally makes the flow of solids more complex and more difficult to handle extraneous materials.

U.S. Pat. No. 7,464,669 to Maryamchik et al. discloses an ash cooler with two chambers-one for discharge of coarser ash and another for finer particles. However, the large particle ash chamber does not have a cooling surface, and therefore the ash withdrawn from the chamber is essentially the same temperature as that in the combustor. It is also difficult to achieve good separation of coarser and finer particles in a fluidized bed. In Maryamchik et al., the fluidization gas returns back to the combustor, a practice which may not be feasible for some applications.

Further, Maryamchik et al. discloses that the tube bundles for cooling the solids penetrate through the refractory walls. For CFB boilers, this practice is not a major issue because the combustor is essentially operated near atmospheric pressure. Even if there is damage to the refractory, it would not lead to catastrophic vessel wall failure due to this low pressure operation. As one of skill in the art appreciates, however, with gasifier operation at high pressure, the cooling surface penetrating the wall can become a serious safety issue, and no known solution exists, other than to avoid it altogether. Further, the cooling surface in the heat exchanger will still be in contact with finer particles essentially at the same high temperature of approximately 1600° F. as that in the combustor, necessitating the use of expensive engineering alloy materials for heat transfer surfaces.

US Patent Publication No. 2009/0300986 to Liu discloses cooling gasification ash from a fluidized bed gasifier. In Liu, the extraneous materials are screened out at the inlet to the cooler and collected in a separate vessel. In this arrangement, substantial recycle gas must be used to purge the small particles from extraneous materials. Substantial recycle gas must be used to prevent small particles from entering the solids cooler, and also for continuously purging the screen to ensure that it remains plug-free. This combination of large purge gas flows and handling the high temperature particles increases the material, fabrication and operation costs.

In Liu, all the purge and fluidization gas flows back to the gasifier, impeding operations if the flow is excessive. Further, the cooling surface of Liu penetrates the refractory and vessel walls of the cooler causing potential difficulties with cooler wall design even with gasifier operating pressures being less than approximately 50 psi. During operation, the cooling surface contacts solid particles that are near the high gasifier operating temperatures, which leads to challenging and expensive design.

What are needed are cost effective and reliable solutions to cool the high temperature, high pressure ash from a gasifier, and other similar applications. It is to such systems and methods that that present invention is primarily directed. The present invention overcomes the various challenges discussed previously, and provides a system for cooling high temperature ash from a coal gasifier operating in a temperature range of from approximately 1500° F. to 2200° F., and a pressure range of from approximately 30 to 1000 psia.

BRIEF SUMMARY OF THE INVENTION

Briefly described, in a preferred form, the present invention provides effective solutions to various issues discussed earlier to withdraw and cool high temperature ash from a gasifier operating at high pressures. The invention is described with its applicability to gasification process, but those who are skilled in the art will appreciate the invention's general applicability to many processes where the high temperature, high pressure solids need to be cooled and withdrawn or returned to the process.

In exemplary embodiments of the present invention, fluidizing gas used in the ash cooler does not return back to the gasifier for both process and safety reasons. Also, in the present invention, the solids are withdrawn from the gasifier into a downflow refractory lined pipe with a U-shape at the bottom of the pipe. In this configuration, the solids enter the primary cooler from the bottom center and flow upwards into a fluidized bed. The fluidizing gas flow upwards along with the solids and exits from the top of the cooler.

In one embodiment of the invention, due to the physical arrangement of the cooler, the cooler solids in the fluidized bed will tend to flow down along the wall and mix with the fresh incoming hot solids from the gasifier, lowering the solids temperature, before they reach the cooling surface. The solids inside the fluidized bed backmixes and globally circulate internally, creating vertical currents. Literature such as Zenz, F. A and Othmer, D. F. (1960, *Fluidization and Fluid-Particle Systems*, pp 290-300) teaches how to calculate as well as presents experimental data of internal solids circulation rates inside the fluidized beds.

The cooler solids circulating internally inside the fluidized bed mix with the hot solids from the gasifier and the mixture temperature will be below 1000° F. The internal solids circulation rate in the fluidized bed and the resulting mixture temperature from mixing of hot and cold solids depends on the superficial gas velocity used to fluidize the solids in the cooler, the bed density, solid particle characteristics and other factors. By adjusting the superficial gas velocity to between 0.1 and 3 ft/s, the internal cooler solids circulation rate and solids mixture temperature can be controlled to the desired temperature before the mixture of solids contact the heat transfer tubes.

In the preferred embodiment, the shape of the bottom of the cooler is a cone. Along the edge of the cone, a plural of nozzles are installed to inject aeration gas into the cooler to fluidize the solid particles. The fluidization velocity is primarily determined by the solid particles size and size distribution and temperature of the solids from the gasifier. The minimum gas velocity required is about 0.1 ft/s greater than the minimum fluidization velocity which can be calculated or determined experimentally by persons skillful in the art of gas-solids fluidization phenomena.

In a preferred embodiment, the space or volume between the inlet for hot solids at the bottom of the cooler to the bottom tip of the cooling tubes inside the fluidized bed shall be such that the hot solids entering the cooler has sufficient time to mix with relatively cooler refluxing (internally circulating) solids from above. Normally, for solid particles size in the range of 0.1 to 10 mm, the solids residence time in this preferred space shall be in the range of 10 to 200 seconds.

The heat transfer surface can be many kinds of tube bundles. In a preferred embodiment, the tube arrangement is in the form of bayonet tubes. In this type of heat transfer surface, each heat transfer tube arrangement actually comprises two concentric tubes, an inside and an outside tube. The inside tube is used as a conduit for water flow from a steam drum under gravity. The water is heated up in the annular region between the inside and outside tubes. The two phase steam and water mixture flows by buoyancy through the annular space and collect above the tube sheet space near the top of the cooler before flowing back to the steam drum.

In the preferred arrangement, the cooler solids in the temperature range of 400 to 600° F. overflows through an exit nozzle located just below the tube sheet. In this arrangement, the cooler solids rarely come in contact with the tube sheet located near the top of the cooler. The tube sheet needs only to be designed for cooler solids exit temperature which shall be below 600° F. Also, the outer bayonet tubes only contact solids below 1000° F. Therefore, no expensive alloys are required for the tube's and tube sheet's material of construction. The solids that come in contact with the cooling tubes are further cooled and, as the bed is fluidized, the solids in the upper portion of the cooler are typically cooled to an exit temperature in the range of 400 to 600° F. Issues associated with support of cooling tubes are eliminated as the tubes are supported with cooler tube sheet.

Other types of tube bundles can also be used in the solids cooler. As the cooler handles high temperature solids, it is essentially a refractory lined vessel. It is preferred that various forms of tube bundles envisaged be fixed near the top of the cooler so that the tube bundle fixture or support is not subjected to high temperature. As the top of the cooler is in the low temperature region, it becomes unnecessary to use refectory lining in the freeboard region to protect the vessel wall. In such a preferred embodiment, the potential damage to refractory by the tube support can be averted by eliminating the refractory altogether in the freeboard region for other types of tube bundles and support.

To further reduce the size of the vessel and cooling costs, the cooling surface handles normal solids flow rate. In applications where the peak hot solids flow rate is much higher than normal rates for short periods of time, provision is made in the present embodiment for additional cooling by injecting atomized water droplets in the cone of the vessel along with the aeration gas.

The fluidized bed of a mixture of hot and cold solids contacts the tube bundle and is cooled to the desired design temperature. The solids have an overall upward flow direction and are withdrawn through a nozzle or a plural of nozzles in the upper portion of the cooler vessel. If the bayonet tubes are installed, the solids are withdrawn from the side wall of the vessel and just below the tube sheet as shown in FIG. 1. The side withdrawal maintains the strength and integrity of the tube sheet. If other types of tube bundles are used, it is immaterial whether the solids are withdrawn from the side wall or from the top of the cooler vessel.

In the preferred embodiment, solids withdrawn from the high temperature primary solids cooler flows into a secondary cooler for further cooling. The secondary cooler provides additional cooling surface to further cool the solids to the desired exit temperature. The ash from the gasifier is typically cooled to an exit temperature in the range of 200 to 350° F. in the secondary cooler. As the secondary cooler receives solids at low temperature, typically in the range of 400 to 600° F. for further cooling, it is an inexpensive non-refractory lined vessel with conventional cooling surfaces and one skillful in the art can conjecture an appropriate low temperature cooling design.

The gas used for fluidization of the first cooler is vented from the top of the secondary cooler through a filter section which prevents fine entrained particles from being released into the vent gas stream. The flow of the dust-free vent gas is regulated through a pressure regulator in the vent line which maintains desired pressure in the secondary cooler and in the free board region of the primary cooler. By adjusting the pressure difference between the gasifier and the secondary cooler with this embodiment, one can control the hot solids flow rate from the gasifier to the bottom inlet of the primary solids cooler.

The cooled solids are withdrawn from the bottom of the secondary cooler. A continuous depressurization system reduces the solids pressure from the operating pressure in the range of 30 to 1000 psi to an exit pressure which is sufficient to convey the solids to a silo for disposal or other downstream processes. U.S. Patent publication No. 2010/0266460 which is incorporated herein by reference, describes the continuous depressurization system with pressure let-down devices which facilitate let-down of the solids stream pressure from operation system pressure to downstream process needs.

In another embodiment of the invention, it is possible for the filter section to be installed on top of the primary solids cooler when the tube bundles are not of bayonet type. If sufficient cooling can be achieved in the primary cooler which satisfies process demands, the solids can be discharged directly to the continuous depressurization system. In such an embodiment, the secondary cooler becomes unnecessary.

In an exemplary embodiment of the present invention, a system of cooling ash and solids from high temperature and high pressure coal gasification environment is provided comprising a downcomer connecting the gasifier and the primary solids cooler and introducing the solids to the bottom of a cone shaped cooler vessel, cooling surface inside the primary solids cooling vessel to exchange heat between the solids and the cooling medium, support near top of the vessel for cooling surface or cooling bundle, a solids outlet near the top section of the primary solids cooler vessel, a gas-solids separation system at the inlet of the secondary cooler, a vent filter section at the top of the secondary cooler to prevent fine entrained solids from entering the vent line, a pressure control vent valve to control the pressure difference between the solids cooler and the gasifier, a secondary cooler (or receiving vessel) to further cool the solids or act as a surge tank for continuous depressurization system, and a continuous pressure letdown system to decrease the operating solids pressure to levels required for discharge.

The system can be capable of cooling and depressurizing ash or solids from a gasifier or a reactor operating at a temperature range of from approximately 1500° F. to 2200° F., and a pressure range of from approximately 30 to 1000 psia. The connecting downcomer and primary solids cooler can be refractory lined to withstand erosion and high temperature.

The cone region and the volume below the cooling surface can be designed to be large enough so that the refluxing cold solids have sufficient time to mix with the incoming hot solids. The cooling surface of the primary cooler can be bayonet type cooling tubes, the outer tubes of which are exposed to a fluidized bed of solids below approximately 1000° F. Omega shaped springs can be attached to the inner bayonet tubes to minimize the effect of tube vibration.

The support of the cooling surface can be located in the low temperature section of the cooler's upper portion, where the maximum temperature which the support materials are subjected to are below 600° F.

The hot solids exiting the gasifier can be at a higher elevation in reference to the cooler solids exiting the primary cooler. With the hydrostatic head due to elevation differences, excess hot solids from the gasifier can be withdrawn, cooled and depressurized to facilitate disposal.

Aeration can be added to the connecting downcomer pipe to control the solids flow due to hydrostatic head created by elevation differences. The aeration rate can be adjusted to have all the aeration gas flow downward along with the solids avoiding disturbance to gasifier or reactor operation. The solids flow control can also be adjusted by balancing the pressure difference between the gasifier and the cooler vessel with a vent pressure control valve.

Extraneous materials from the gasifier can be separated from hot solid particles with sufficient aeration in the bottom cone portion of the primary solids cooler.

The hot incoming solids can be mixed inside the primary cooler with the cold refluxing solids from above to maintain the solids mixture temperature below approximately 1000° F. before the solids mixture contacts the cooling surface.

Fluidizing gas exiting along with the cooled solids from the primary cooler vessel can be filtered, and the clean gas vented to downstream processes.

The secondary vessel can receive the solids from the primary cooler for further cooling and the solids can flow downward by gravity, and exit through bottom of the vessel.

The cooled solids can be withdrawn from the secondary vessel through a continuous depressurization system that reduces the solids stream pressure to the desired level for conveying.

In another exemplary embodiment of the present invention, a cooling system for cooling solids entering the cooling system at an average temperature of above approximately 1500° F. comprises a cooler having an inlet for accepting solids at an average temperature of above approximately 1500° F., the cooler having an outlet for exiting at least a portion of the solids at an average temperature of below approximately 600° F., a heat transfer system in the cooler, and a fluidized bed of refluxing cool material (cooler solids near exit temperature) in the cooler, wherein the solids enter the cooler through the inlet at an average temperature of above approximately 1500° F., wherein at least a portion of the solids mix in the cooler with at least a portion of fluidized bed of refluxing cool material until the average temperature of at least a portion of the solids is cooled to less than approximately 1000° F., wherein at least a portion of the solids at an average temperature of less than approximately 1000° F. contact the heat transfer system in the cooler, which heat transfer system further cools at least a portion of the solids to an average temperature of less than approximately 600° F., and wherein at least a portion of the solids at an average temperature of below approximately 600° F. exit the cooler through the outlet.

The solids can enter the cooler through the inlet at the bottom of the cooler at an average pressure of above approximately 30 psia. The solids can have a mass mean diameter in the range of approximately 50 microns to 400 microns.

The cooler can be a vertical vessel having a bottom and a top, and the inlet of the cooler can be located at the bottom of the cooler.

The cooling system can further comprise a downcomer introducing the solids at an average temperature of above approximately 1500° F. to the bottom of the cooler, a support in a low temperature section in proximity of the top of the cooler for supporting the heat transfer system, a second cooler, and a gas-solids separation system, wherein the at least a portion of the solids at an average temperature of below approximately 600° F. exit the cooler through the outlet and into the gas-solids separation system and then into the second cooler, to further cool the solids.

The downcomer and primary solids cooler can be refractory lined.

The cooling system can further comprise a vent filter section at the top of the second cooler to limit entrained fines from entering the vent lines, and a pressure control system to regulate the pressure difference between the cooler and the gasifier.

The cooling system can further comprise a continuous pressure letdown system, wherein the cooled solids are withdrawn from the second cooler through the continuous pressure letdown system that reduces the solids stream pressure to a desired level for conveying from the second cooler.

The primary cooler bottom can be cone-shaped providing a cone region and incorporate the inlet, and the downcomer can provide the solids to the inlet in the bottom of the cooler. The cone region and the volume of the primary solids cooler below the heat transfer system can be sized so that refluxing cold solids have sufficient time to mix with the incoming hot solids from the downcomer.

The cooling system can further comprise a pressure control system to regulate the pressure difference between the cooler and the gasifier.

In another exemplary embodiment of the present invention, a method of cooling solids at an average temperature of above approximately 1500° F. to an average temperature of less than approximately 600° F. comprises providing solids at an average temperature of above approximately 1500° F., mixing the solids with a fluidized bed of refluxing cool material to form a portion of solids with an average temperature of less than approximately 1000° F., and contacting a portion of solids with an average temperature of less than approximately 1000° F. with a heat transfer system to form a portion of solids with an average temperature of less than approximately 600° F.

The method of cooling can further comprise providing the solids at an average temperature of above approximately 1500° F. at an average pressure of above approximately 30 psia.

The method of cooling can further comprise providing the solids at an average temperature of above approximately 1500° F. at a mass mean diameter in the range of approximately 50 microns to 400 microns.

The method of cooling can further comprise providing a primary cooler in which the cooling steps take place, supporting the heat transfer system in proximity of the top of the cooler, providing a secondary cooler, wherein the at least a portion of the solids at an average temperature of below approximately 600° F. exit the primary cooler, separating the gas and solids prior to entrance into the secondary cooler, and cooling the solids further in the secondary cooler.

The method of cooling can further comprise filtering to limit fine solids over a predetermined size from entering the vent line, and controlling the pressure difference between the primary cooler and the gasifier operating at an average temperature of above approximately 1500° F.

The method of cooling can further comprise continuously lowering the pressure of the cooled solids withdrawn from the secondary cooler to reduce the solids stream pressure to a desired level for conveying from the secondary cooler.

The method of cooling can further comprise withdrawing, cooling and depressurizing excess solids from a gasifier at an average temperature of above approximately 1500° F. to facilitate their disposal.

The method of cooling can further comprise adjusting the solids aeration rate in the downcomer to control the solids flow due to hydrostatic head created by elevation differences.

The method of cooling can further comprise adjusting the pressure difference between the gasifier and the cooler with a vent pressure controller to further control the hot solids flow to the inlet of the cooler.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
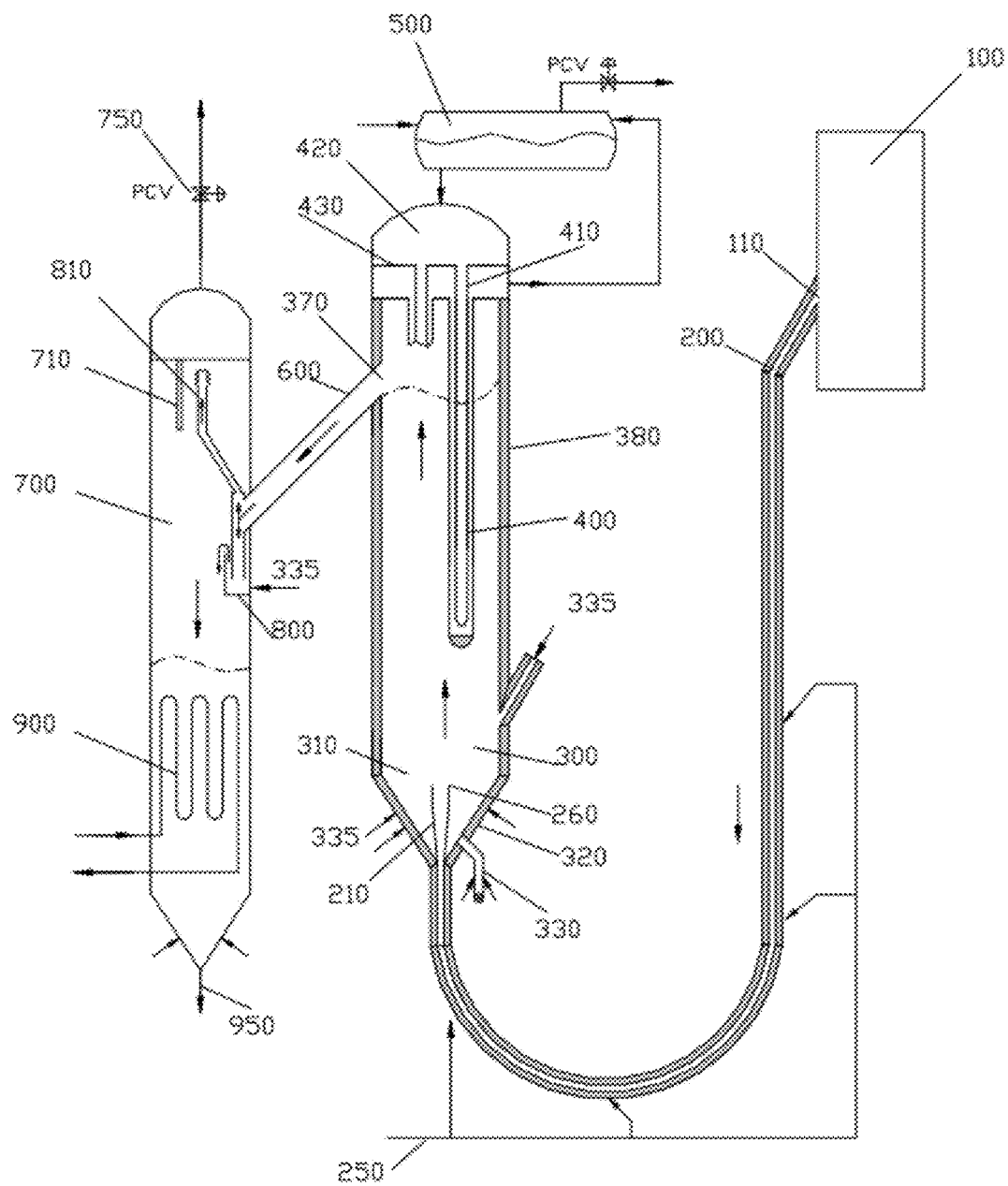
FIG. 1 illustrates a solids heat exchanger to handle hot solids from a high temperature, high pressure source, according to an exemplary embodiment of the present invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention has broad applications to cool and handle hot solid particles such as catalysts and products from various chemical reactors as well as ash and spent sorbent particles from combustors and ash and unutilized char mixtures from gasifiers. The detailed description of the invention is provided with respect to a specific example of cooling and then depressurizing hot solids from a pressurized gasifier, but equally applicable to other situations requiring cooling of solid particles from high temperature and high pressure environment.

As illustrated in FIG. 1, the solids (the term "solids" is used herein in general to describe a distribution of particles with mass mean diameter in the range of 50 to 400 microns, commonly solids from a coal gasifier comprising mostly ash with little char) generated in the reactor, combustor or a gasifier 100 are withdrawn through the connecting downcomer pipe 200 through the nozzle 110. The connecting downcomer pipe and the primary cooler vessel are refractory lined to protect from both erosion and high temperature environment. The fluidized bed gasifiers operating temperature generally is in the range of approximately 1700° F. to 2000° F. and operating pressure is in the range of approximately 30 to 1000 psia. In a preferred embodiment, the solids flow direction is generally downward at the nozzle 110. For equipment layout and piping connection convenience, the nozzle can be angled between approximately 10 and 90 degrees from horizontal with flow generally in downward direction. Aeration nozzles 250 are added if the pipe length is greater than twenty times the pipe diameter. Aeration gas flow can be adjusted to flow along with the hot solids to solids cooler.

The solids from the gasifier enter the primary cooler 300 at the bottom center opening 260 as illustrated in FIG. 1. In one embodiment, the pipe 200 connecting the primary cooler 300 can have an extension 210 into the primary cooler space 300. Part of the cone section 320 of the refractory lined primary cooler vessel 300 and the extended inlet 210 form an annular cavity 310 that is essentially a stagnant zone with minimum aeration. The purpose of this stagnant zone is to collect sufficiently large pieces of extraneous and foreign materials that enter the primary cooler and safely drain the cooler of these materials (with drain nozzle 330) to limit or prevent interference with the solids cooling operation. The pipe extension and stagnant zone are unnecessary for applications where solids entering the cooler are free of extraneous materials.

With minimum aeration, the annular cavity 310 can be fluidized to segregate extraneous materials from normal ash particles. One advantage of this configuration is that the cross-sectional area of the annular cavity 310 can be designed as needed by adjusting the size, shape and angles of both the extended center pipe and the cone to minimize the consumption of aeration gas that fluidizes the small particles and segregate the larger particles from the smaller particles. Those of skill in the art can devise various ways based on size segregation to separate the extraneous materials from normal operating solid particles such as a mixture of ash and char from the gasifier.

Figure 2:
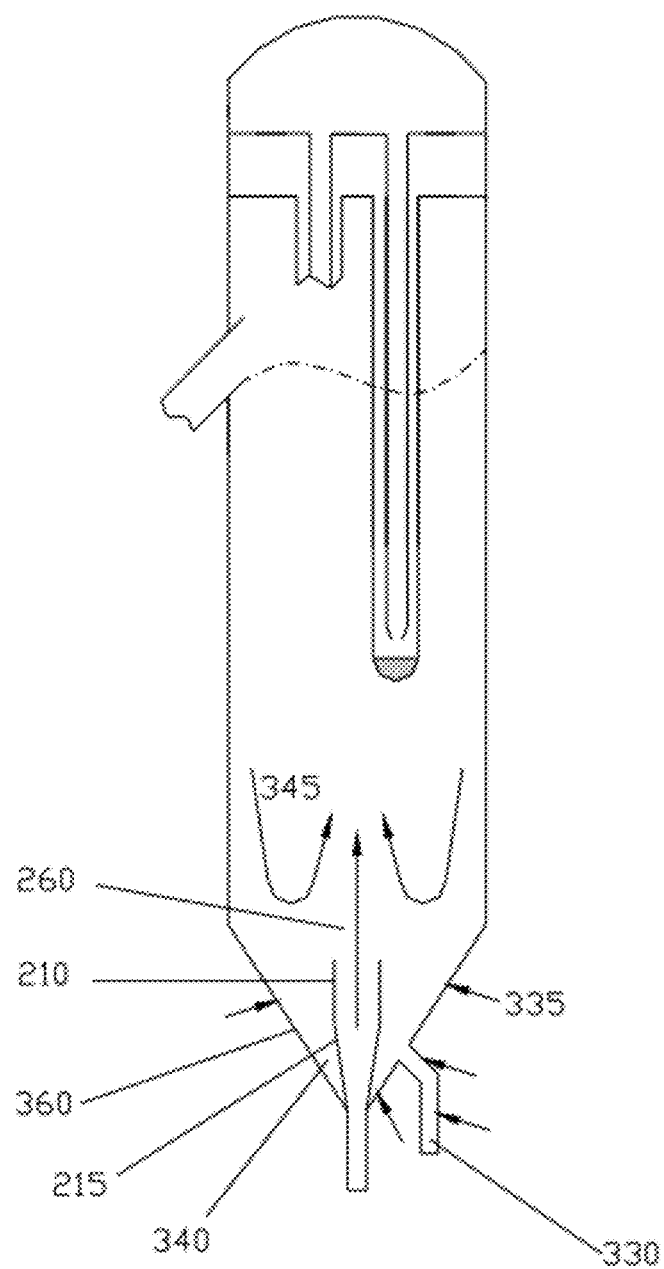
FIG. 2 illustrates a bottom cone section of primary solids cooler according to an exemplary embodiment of the present invention.

FIG. 2 illustrates an example of a design of the cone section and the extended center pipe to separate the extraneous materials from normal ash mixture. The center pipe 210 can have another cone section 215, the angle of which can be adjusted to achieve the desired cross-sectional area between the vessel and the cone 215 in order to minimize the requirement for the fluidization gas. Aeration gas 335 is added to various nozzles around the cone. The aeration gas fluidizes the solids in the upper section of the primary cooler for better heat transfer. Extraneous materials that are normally large pieces of chipped refractory and clinkers, sink to the bottom of the primary cooler and are discharged through the drain pipe 330. Depending on the process, the annular cavity space 340 formed between the center pipe 215 and the vessel cone 360 can be used to store extraneous materials during normal operation and removed whenever the process is in outage.

Referring to the embodiment in FIG. 2, after the large pieces of extraneous materials have been separated from normal ash, the hot ash stream 260 entering the primary cooler mixes with the internally circulating cooler ash stream 345, which has a temperature in the range of approximately 400° F. to 600° F. Due to the mixing of the two streams, the mixture temperature of the solids is in the range of approximately 800° F. to 1000° F. Therefore, the cooling surface (for example, outer tube 400 of bayonet tube arrangement in FIG. 1) in contact with the fluidized solids particles is far below the inlet temperature of approximately 1500° F. to 2200° F. from the gasifier. The low solids temperature of approximately 800° F. to 1000° F. that is in contact with the ash cooling surface minimizes, if not eliminates, the need for expensive alloy materials as materials of construction for the cooling surface. The entire cooling surface in the first stage primary cooler can be constructed using common carbon steel.

The solids mixture flows upwards in the primary cooler due to the drag of the gas and due to the pressure difference between the cooler solids inlet 260 and the solids outlet 370. The gas-solids mixture contacts the cooling surface 400 in the primary cooler. In the preferred embodiment, the cooling surface is made of bayonet type of cooling tubes which include two concentric pipes: the outer pipe 400 and the inner pipe 410 as illustrated in FIG. 1.

Figure 3:
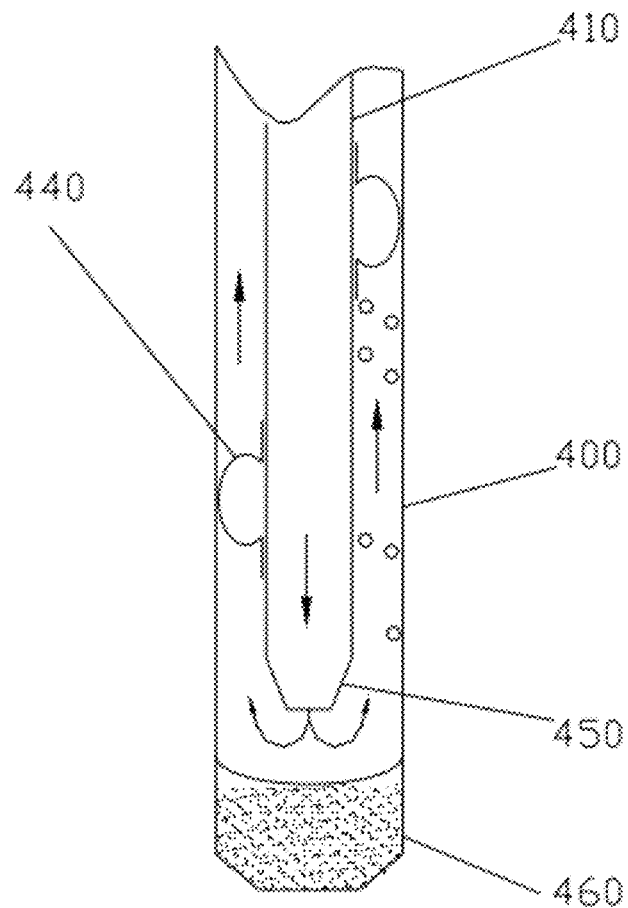
FIG. 3 illustrates a fixture arrangement of bayonet heat exchanger tubes according to an exemplary embodiment of the present invention.

The coolant fluid (water) preferably flows downward under gravity from steam drum 500 into the space 420 formed by the vessel wall 380 of the primary cooler and the tube sheet 430. The water is distributed into a plural of tubes (inner pipes 410) attached to the tube sheet 430. The water flows downward in the inner pipe 410, form a steam-water mixture as it absorbs heat, and then the two phases of steam bubbles and saturated water flow upwards in the annular space formed by the inner pipe 410 and the outer pipe 400 as illustrated in FIG. 3. The heat source for the partial water evaporation to steam bubbles in the annular space is the fluidized bed of approximately 800° F. to 1000° F. hot ash that surrounds the outer pipe. Steam bubbles separate from water in the steam drum and the steam drum pressure is typically maintained at approximately 50 psi by venting steam through a drum pressure control valve.

The sizing of the primary solids cooler and the extent of heat transfer area needed depends upon the desired exit temperature of the solids. Both from a performance and economics viewpoints, it is desirable to cool the ash to an approximately 400° F. to 600° F. primary cooler exit temperature. Further cooling to much lower temperatures can be accomplished in a secondary cooler 700 (FIG. 1) with much lower temperature cooling water flow through the cooling tube bundle 900.

Ash cooled to approximately 400° F. to 600° F. overflows from near the top of the primary solids cooler through exit 370 as illustrated in FIG. 1. The fluidizing gas also exits the primary cooler along with the solids and flow through a conduit 600 into a gas-solids separator system 800 imbedded in the secondary cooler 700. The gas-solids separator system normally comprises a cyclone with a dipleg and a seal (loop seal 800, for example) for the dipleg. A purpose of the gas-solids separator is to prevent the gas from carrying large amount of solid particles to the barrier filters 710. After separating most of the solids from the gas-solids stream flowing into the cyclone, the gas exiting the cyclone with entrained finer particles flow upwards through a distributing conduit 810.

The distributor at the exit of 810 evenly distributes the gas to the barrier filters 710. The barrier filters are normally made of a plural of sintered metal filters to block the finer particles and allow the cleaner gas to permeate through the filter. The filtered gas flows through the pressure control valve 750 and vent to an appropriate location, preferably downstream of the process streams that are at lower pressure. The fluidizing gas from the primary solids cooler is thus cleaned and vented not back to the gasifier, but to downstream processes. This way, the amount of fluidizing gas in the primary cooler can be optimized to achieve desired internal solids circulation and maximize heat transfer from the fluidized bed.

The disengaged solids from the secondary cooler cyclone and loop seal 800 along with the finer solids from the barrier filters 710 flow through a bank of cooling surface 900 to be cooled to a desired exit temperature. Aeration gas 335 from the secondary cooler also is filtered and vented through the pressure control valve 750. The cooled solids are then discharged through exit nozzle 950 at the bottom of the secondary cooler. The cooled solids exiting 950 are still at high operating gasifier pressure. It is preferred that the ash is depressurized through a continuous ash depressurization system as disclosed, for example, in US Patent Publication No. 2010/0266460, the teachings of which are incorporated herein by reference. 2010/0266460 discloses a continuous depressurization system with pressure let-down devices that facilitate let-down of the solids stream pressure from a high operation system pressure to a lower pressure that downstream process needs.

FIG. 3 provides a method of limiting or preventing the vibration of the inner pipe 410 of the bayonet tube arrangement. An Omega-shaped fixture 440 is welded onto the inner pipe 410 on one leg of the Omega. The top of the Omega is in contact with the outer pipe 400. The Omega fixture is typically located at three feet intervals and at an orientation of 120 degrees. With this embodiment, the inner pipe is constrained by the Omega fixture. One skilled in the art can devise several ways to constrain the outer tube from vibrational effects while allowing for axial expansion. The key is to support the constraining mechanism, for example one or more constraining grids depending on the length of the tubes, from primary cooler's upper section, which is typically below 600° F.

The water from the drum flowing through the inner pipe 410 exits the inner pipe through a restricted section 450 at velocities in the range of approximately 5 to 15 ft/s. Such velocities limit or prevent accumulation of impurities in the water system or scales at low points in the bayonet tubes. The lower portion of the outer tube is cladded with a thick metal cap 460 to limit or prevent erosion.

During gasifier operation, coal ash accumulates in the gasifier. The circulating solids inventory in the gasifier is maintained by withdrawing the accumulating coal ash through the solids cooler system. The high temperature ash is cooled and depressurized for conveying to an ash silo for disposal. As illustrated in FIG. 1, the solids take-off nozzle 110 on the gasifier is located at about five feet above the primary cooler overflow exit nozzle 370. This arrangement creates a hydrostatic head for solids to naturally flow from the gasifier to the primary solids cooler whenever the connecting J-shaped downcomer pipe is fluidized. In addition to hydrostatic head, the solids flow is also controlled through the vent pressure control valve 750. In operation, the pressure difference between the take-off point and vent pressure induced by 750 is used for coarse control, and fluidization gas flow in the connecting J-shaped downcomer pipe is used for finer control of hot solids flow to the primary solids cooler.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A system of cooling ash and solids from high temperature and high pressure coal gasification environment, the cooling system comprising:
   a gasifier;
   a primary solids cooler;
   a downcomer connecting the gasifier and the primary solids cooler, and introducing the solids to the bottom of the primary solids cooler;
   a heat transfer system in the primary solids cooler to exchange heat between the solids and a cooling medium;
   a support in proximity of the top of the cooler for supporting the heat transfer system;
   a solids outlet in proximity of the top of the primary solids cooler and below the support;
   a secondary cooler;
   a gas-solids separation system at an inlet of the secondary cooler;
   a vent filter section in proximity of the top of the secondary cooler to limits solids over a predetermined size from entering a vent line;
   a pressure control vent valve to control the pressure difference between the primary solids cooler and the gasifier; and
   a continuous pressure letdown system, wherein the cooled solids are withdrawn from the secondary cooler through the continuous pressure letdown system that reduces the solids stream pressure to a desired level for conveying from the secondary cooler.

2. The system of claim 1, wherein:
   the primary solids cooler has an inlet at the bottom for accepting the solids at an average temperature of above approximately 1500° F., the primary solids cooler having the solids outlet in an upper section for exiting at least a portion of the solids at an average temperature of below approximately 600° F.;
   the cooling medium comprises a fluidized bed of refluxing cool material in the primary solids cooler;
   the solids enter the primary solids cooler through the inlet at an average temperature of above approximately 1500° F.;
   at least a portion of the solids mix in a lower section of the primary solids cooler with at least a portion of fluidized bed of refluxing cool material until the average temperature of at least a portion of the solids is cooled to less than approximately 1000° F.;
   at least a portion of the solids at an average temperature of less than approximately 1000° F. contact the heat transfer system in the primary solids cooler, which heat transfer system further cools at least a portion of the solids to an average temperature of less than approximately 600° F.; and
   at least a portion of the solids at an average temperature of below approximately 600° F. exit the primary solids cooler through the solids outlet;
   wherein the system is configured to handle a solid particles to gas mass ratio after depressurization of at least 1000.

3. The system of claim 2, wherein the solids enter the primary solids cooler through the inlet at an average pressure of above approximately 50 psia.

4. The system of claim 2, wherein:
   the downcomer introduces the solids at an average temperature of above approximately 1500° F. to the bottom of the primary solids cooler; and
   wherein the at least a portion of the solids at an average temperature of below approximately 600° F. exit the primary solids cooler through the solids outlet and into the gas-solids separation system and then into the secondary cooler, to further cool the solids.

5. The system of claim 2, wherein the solids enter the primary solids cooler through the inlet at an average temperature of between approximately 1500° F. and 2200° F.; and
   wherein the solids enter the primary solids cooler through the inlet at an average pressure of between approximately 50 psia and 1000 psia.

6. The system of claim 5, wherein the primary solids cooler is a vertical vessel, wherein the bottom of the primary solids cooler is cone-shaped and incorporates the inlet, and wherein the downcomer provides the solids to the inlet in the bottom of the primary solids cooler.

7. The system of claim 5, wherein the at least a portion of the solids at an average temperature of below approximately 600° F. exit the primary solids cooler through the solids outlet and into the gas-solids separation system and then into the secondary cooler, to further cool the solids.

8. The system of claim 1, wherein the system cools and depressurizes ash or solids from the gasifier operating an average temperature of between approximately 1500° F. and 2200° F. and an average pressure of between approximately 50 psia and 1000 psia;

wherein the solids outlet in proximity of the top of the primary solids cooler provides an exit for at least a portion of the solids at an average temperature of below approximately 600° F.;

wherein at least a portion of the solids mix in the primary solids cooler with a fluidized bed of refluxing cool material until the average temperature of at least a portion of the solids is cooled to less than approximately 1000° F.;

wherein at least a portion of the solids at an average temperature of less than approximately 1000° F. contact the heat transfer system in the primary solids cooler, which heat transfer system further cools at least a portion of the solids to an average temperature of less than approximately 600° F.; and wherein at least a portion of the solids at an average temperature of below approximately 600° F. exit the primary solids cooler through the solids outlet.

9. The system of claim 1, wherein the secondary cooler comprises a non-refractory lined vessel.

10. The system of claim 1, wherein the bottom of the primary solids cooler is cone-shaped providing a cone region, and wherein the cone region and the volume of the primary solids cooler below the heat transfer system is sized so that refluxing cold solids have sufficient time to mix with the incoming solids from the downcomer.

11. The system of claim 1, wherein the heat transfer system comprises bayonet type cooling tubes.

12. The system of claim 11 further comprising Omega-shaped springs attached to the bayonet type cooling tubes to dampen vibration.

13. The system of claim 1, wherein where the solids exit the gasifier is at a higher elevation than the solids outlet in proximity of the top of the primary solids cooler.

14. The system of claim 2, wherein the downcomer comprises a U-shaped portion between the gasifier and the primary solids cooler so the solids enter the primary solids cooler from the bottom center and flow upwards into the fluidized bed.

15. The system of claim 1, wherein the bulk density of solids in the downcomer is in the range of 35-65 lb/ft$^3$.

16. The system of claim 1, wherein the solids have a mass mean diameter of between approximately 50 microns and 400 microns.

17. The system of claim 1, wherein the bulk density of solids in the downcomer is in the range of 35-65 lb/ft$^3$, and wherein the solids have a mass mean diameter of between approximately 50 microns and 400 microns.

18. The system of claim 1, wherein the downcomer is refractory lined.

19. The system of claim 1, wherein the primary solids cooler is refractory lined.

20. The system of claim 1, wherein the bottom of the primary solids cooler is cone-shaped and incorporates an inlet for accepting the solids from the downcomer, the downcomer having an extension into the cone-shaped bottom of the primary solids cooler, forming an annular cavity between the downcomer extension and the cone-shaped bottom of the primary solids cooler.

21. The system of claim 20 further comprising one or more aeration nozzles in the cone-shaped bottom of the primary solids cooler for introduction of aeration gas to fluidize the solids in an upper section of the primary solids cooler.

22. The system of claim 20 further comprising a drain pipe in the cone-shaped bottom of the primary solids cooler for removal of extraneous materials that sink to the bottom of the primary solids cooler.

* * * * *